March 22, 1938.  C. R. ECKERT  2,111,761
PROCESS AND APPARATUS FOR COATING ROOFING
Filed Dec. 18, 1933  4 Sheets—Sheet 1
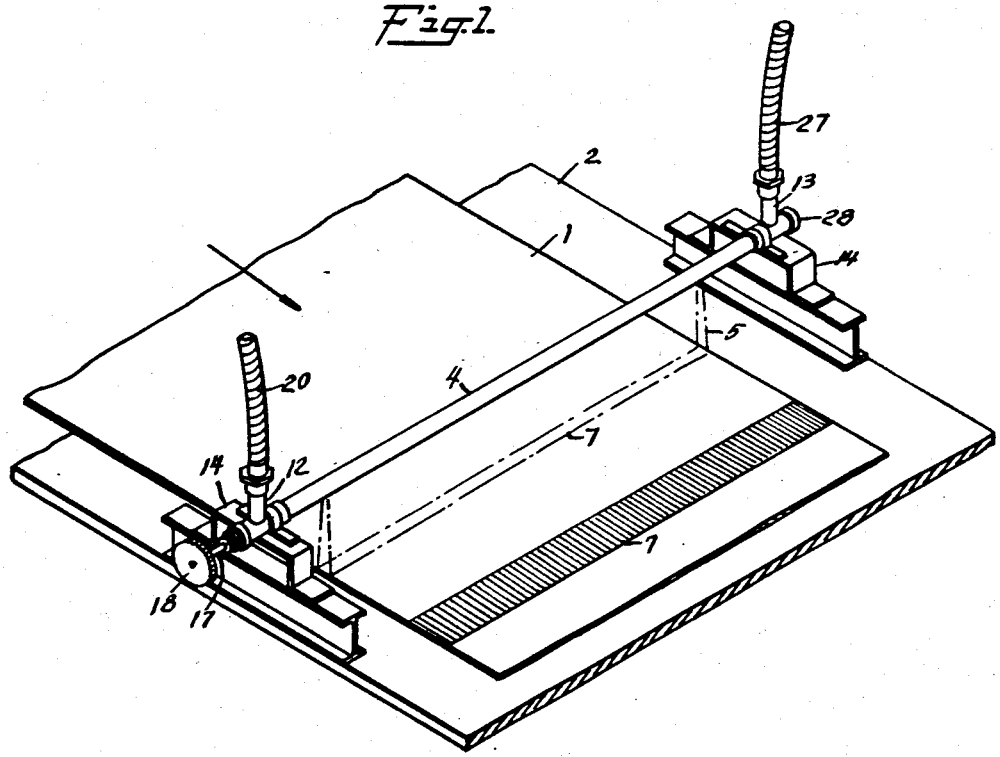
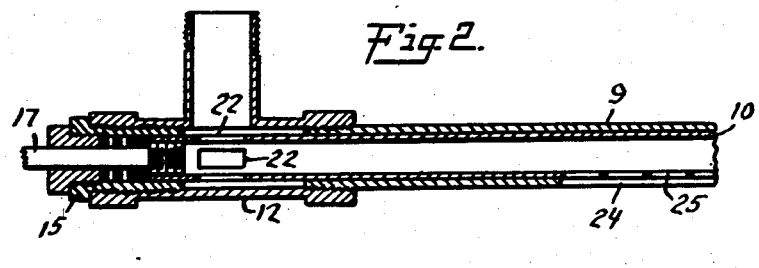
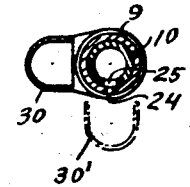
INVENTOR
Clarence R. Eckert
BY
ATTORNEY March 22, 1938. C. R. ECKERT 2,111,761
PROCESS AND APPARATUS FOR COATING ROOFING
Filed Dec. 18, 1933    4 Sheets-Sheet 2
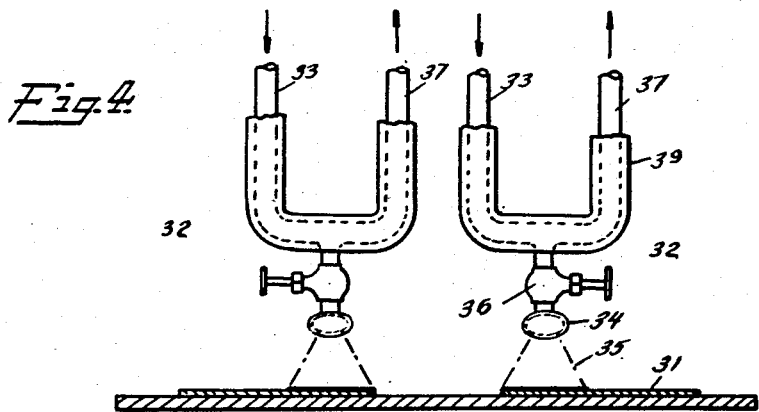
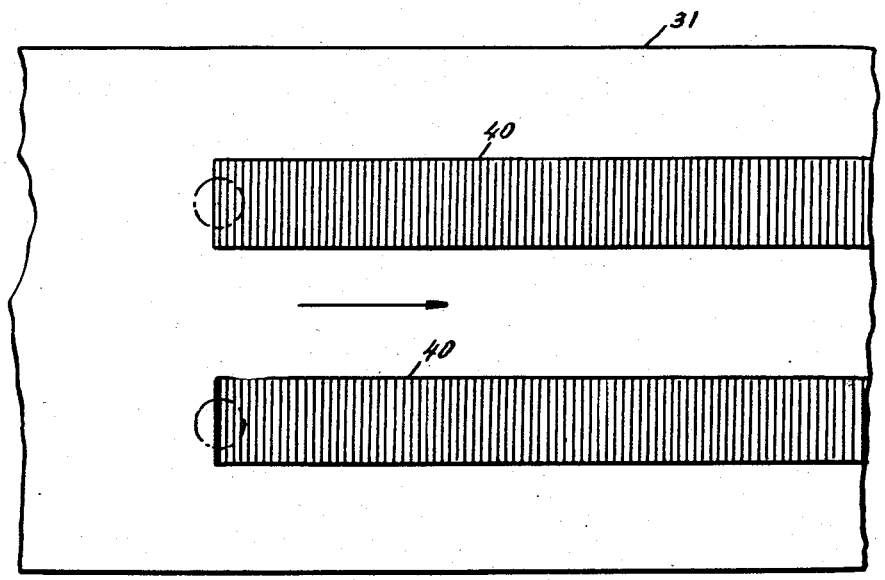
INVENTOR
Clarence R. Eckert
BY
ATTORNEY March 22, 1938.  C. R. ECKERT  2,111,761
PROCESS AND APPARATUS FOR COATING ROOFING
Filed Dec. 18, 1933  4 Sheets-Sheet 3

INVENTOR
Clarence R. Eckert
BY
ATTORNEY

March 22, 1938. C. R. ECKERT 2,111,761
PROCESS AND APPARATUS FOR COATING ROOFING
Filed Dec. 18, 1933 4 Sheets-Sheet 4
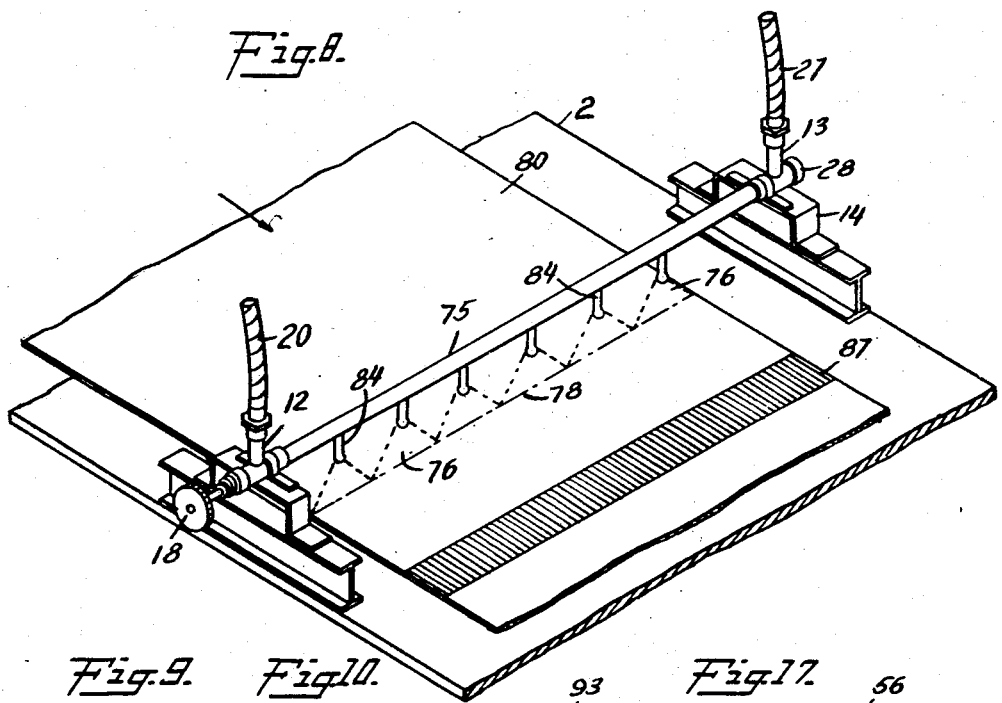
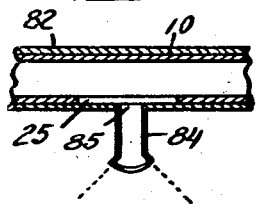
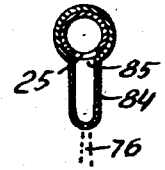
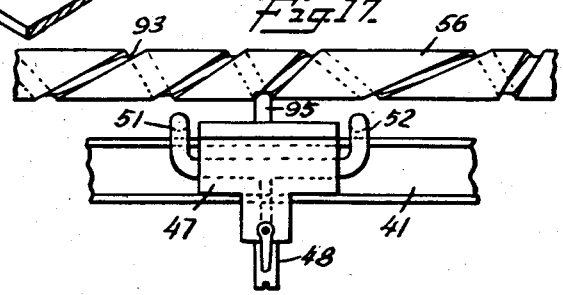
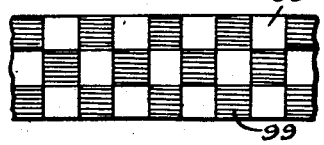
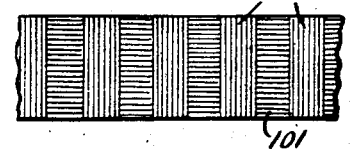
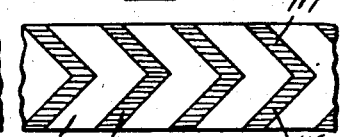
INVENTOR
Clarence R. Eckert
BY
ATTORNEY Patented Mar. 22, 1938

2,111,761

UNITED STATES PATENT OFFICE 2,111,761

PROCESS AND APPARATUS FOR COATING ROOFING

Clarence R. Eckert, Englewood, N. J., assignor to The Barrett Company, New York, N. Y., a corporation of New Jersey Application December 18, 1933, Serial No. 702,891

16 Claims. (Cl. 41—1)

This invention relates to processes and apparatus for applying coating material to a sheet or other plane surface and more particularly to the application of bituminous or other waterproofing material to felt base roofing.

One object of this invention is to provide a procedure and apparatus for applying liquefied bituminous coating to regularly spaced and limited areas of a roofing base to produce ornamented roofing and preferably simultaneously seal the edges of the roofing.

Another object of the invention is to provide a procedure and apparatus for applying clearly defined bands of asphalt or other bituminous material onto a moving web of roofing fabric to form a desired design thereon.

Another object of the invention is to provide apparatus for automatically applying spaced parallel bands of liquefied bituminous material crosswise of a web of roofing fabric or at any desired angle to the longitudinal edge of the fabric.

Heretofore in the manufacture of shingles or sheet roofing on which a design or ornamentation was produced by the application of bituminous material to desired selected areas, it was common practice to apply such bituminous material by means of coating or printing rolls. The present invention provides an improved method for applying waterproof material in the manufacture of roofing and siding elements. In accordance with my invention the coating material, which may be asphalt, bitumen, or other coating liquid either alone or mixed with bronzing powder or other pigment, is automatically applied to a moving sheet of roofing base by means of a suitably constructed liquid-delivery spout such as a spraying device or spray gun. With this apparatus and by this method the cementitious or adhesive coating may be confined to certain well defined areas or lanes, thereby producing a design or geometrical configuration. If desired, the liquefied waterproof coating may be applied so that simultaneously with the coating of the face of the strip the edges are coated and thus sealed.

The apparatus of the present invention is also particularly useful in a double-coating operation where dipping or other film methods of application were heretofore employed such as in the production of thick-butt shingles or sheet roofing. Hand dipping necessarily involves coating the under portion of the shingle or sheet roofing as well as the wear-resisting top portion and causes a considerable waste of coating material. By using the spraying device of the present invention, the coating may be confined to the areas adapted to be exposed to the weather, namely, the top side of the butt portion and the edges.

For a better understanding of the invention, reference should be made to the accompanying drawings wherein is shown by way of illustration several types of apparatus embodying the principles of this invention. In the drawings,—

Fig. 1 is a perspective view of a spraying apparatus for applying spaced parallel bands of coating material perpendicular to the direction of movement of the roofing;

Fig. 2 is an enlarged sectional view of the spray valve shown in Fig. 1;

Fig. 3 is an enlarged transverse sectional view through the spray pipe showing the valve arrangement and drip-catching trough;

Fig. 4 is an elevation showing apparatus for applying spaced parallel bands of coating material to a base sheet, the bands running in the direction of travel of the sheet;

Fig. 5 is a plan view of a sheet showing an arrangement of the bands as applied by the apparatus of Fig. 4;

Fig. 8 is a perspective view of a modified type of spraying apparatus similar to that shown in Fig. 1;

Fig. 9 is an enlarged sectional view of a portion of the spray pipe shown in Fig. 8;

Fig. 10 is an enlarged transverse sectional view through the spray pipe showing the valve arrangement;

Figs. 11 to 16 are plan views of portions of coated sheets showing various types of designs which may be produced; and Fig. 17 is a partial view in elevation showing an arrangement for moving the spray nozzles of Fig. 6 across the sheet at a variable rate.

Figure 6:
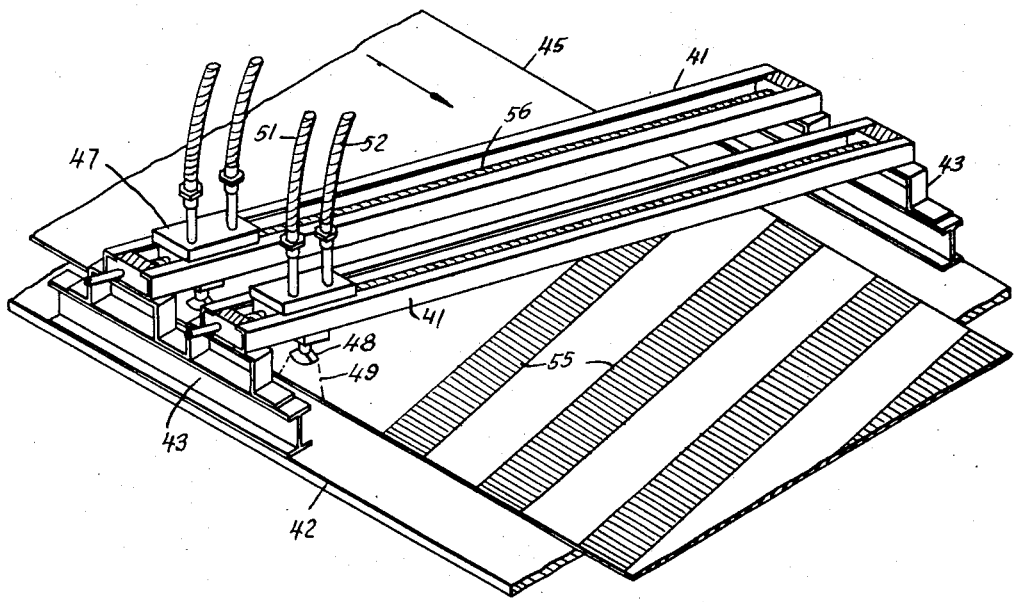
Fig. 6 is a perspective view of a spraying apparatus for applying spaced bands of coating at any desired angle to the direction of travel of the roofing.

As shown in Fig. 1, the sheet of roofing fabric 1, which may previously have been saturated with waterproofing material and surfaced with grit, such as crushed slate, stone, and the like, is passed over a suitable table or supporting device 2 in the direction shown by the arrow. During its travel over the table 2, the fabric passes under spraying device 4 extending in a direction perpendicular to the direction of travel of the fabric, and receives a periodically ejected spray of coating material 5. Since the spray is intermittent, the coating will be applied to the fabric in a series of spaced parallel bands or stripes 7.

As shown in Fig. 2, the spraying device 4 comprises two concentrically arranged pipes or sleeves 9 and 10. The outer sleeve 9 is adapted to remain stationary and is screwed into suitable T connections 12 and 13 disposed at the ends of the sleeve. These T's are rigidly fixed to supports 14 and hold the outer sleeve 9 in fixed position. T 12 is provided with a suitable packing gland and nut 15 through which shaft 17, rigidly fixed to the inner sleeve 10, passes. Onto the shaft is keyed or otherwise fixed a gear or pulley 18 which may be revolved by any suitable driving means, thereby causing the rotation of inner sleeve 10.

Hot coating material is brought from a source of supply through inlet pipe 20 connected to the branch of T 12 and passes from T 12 through openings 22 into the interior of revolving inner sleeve 10. As shown in Figs. 2 and 3, stationary outer sleeve 9 and revolving inner sleeve 10 are provided with longitudinal slots 24 and 25 respectively. For a certain period during each revolution of the inner sleeve, slots 24 and 25 will coincide and form an open channel or orifice through which coating material will be forced or ejected onto the fabric in the form of a spray. As the inner sleeve continues to rotate, the solid wall of the inner sleeve will be brought over slot 24, thus closing the channel and shutting off the spray. This condition will continue to exist until the rotation of the inner sleeve again causes the slots to coincide. Any excess coating material introduced into the spraying device passes from the inner sleeve out through the branch of T 13 and is removed through outlet pipe 27. The excess coating material which is removed may be collected in a special tank arranged for this purpose or may be returned to the original source of supply. By circulating excess material through the spray, the viscosity of the coating material is maintained substantially uniform. The outlet of T 13 is provided with a suitable plug 28 which can be readily removed in case it is desirable to clean the lines by the insertion of a rod, flush, or drain the lines.

As shown in Fig. 3, a drip-catching trough 30 rotatable from position 30 to 30' around the longitudinal axis of the concentric sleeves may be provided to catch any drip from the spraying device when the valve is in closed position. If desired, movement of this trough may be automatically controlled by the rotation of shaft 17 whereby the trough will move in timed relation with the spray valve. Use of this trough makes it possible to procure very distinct and clearly defined boundaries to the bands of coating material on the fabric.

If desired, suitable heating means such as a steam jacket may be used on the inlet and outlet lines and even on the spray valve itself in order to maintain the coating material passing therethrough at the proper temperature and in a fluid condition.

The relation between the widths of the bands and the uncoated portions of the fabric is dependent chiefly on the sum of the angular widths of the slots 24 and 25. These may be chosen to give a desired ratio of coated to uncoated material. If the angular width of the inner slot is made 360°, which could be done by omitting the inner sleeve from the spraying device, the resultant spray would be continuous and consequently would produce a uniform coating extending the entire length of the sheet. Altering the speed of revolution of the inner sleeve or the rate at which the fabric travels will cause the widths of the coated and uncoated portions to be altered to any desired extent.

The inner sleeve 10 may be oscillated instead of rotated, and the widths of the coated and uncoated bands may be controlled by regulating the widths of the openings 24 and 25 and the period of oscillation of sleeve 10, with respect to the felt travel.

It should be understood that by moving supports 14 with respect to each other, it will be possible to set the spraying device 4 at an angle with respect to the longitudinal axis of the sheet so that bands of coating may be formed on the fabric at any desired angle to the direction of travel thereof.

Figs. 4 and 5 shown a spraying apparatus for applying spaced bands of coating material longitudinally of the roofing sheet or sheets passing thereunder. As shown in Fig. 4, coating material 35 is applied to the roofing 31 by means of two spaced spraying devices 32. In each of these devices the coating material is pumped from the source of supply through supply pipe 33 into spray nozzle 34. A suitable regulating valve 36 is provided in the line to the nozzle so that the supply may be shut off or otherwise regulated as desired. A single roofing sheet in passing under these spraying devices will receive a continuous spray of coating material in the form of spaced parallel bands 40, as shown in Fig. 5.

Supply pipe 33 is connected with a return or outlet pipe 37 so that excess coating material can always be circulated through the line and returned to the source of supply. In this way a uniform pressure is maintained on the spray nozzles and the bituminous material such as asphalt is maintained at a substantially uniform viscosity. A suitable heating jacket 39 may be provided around the supply and return pipes in order to maintain the coating material passing therethrough at the proper temperature and prevent it from congealing and clogging up the lines. Steam, hot water, hot oil, or other suitable fluid may be circulated through the jacket in order to maintain the proper temperature. Although two spaced spray devices are shown in the drawing, it is obvious that any number may be used to meet the desired conditions.

The sprays of Fig. 4 may be used to coat strips of roofing felt which may be cut with spaced tabs of any desired configuration as for example, rectangular, semi-hexagonal, etc. The sprays may be designed so that they direct coating material on the edges as well as on the face of the roofing, thus coating the edges simultaneously with the coating of the face of the element. In Fig. 4 individual strips of roofing are shown passing under each spray in such a manner that each strip will be coated only on that portion of the face and edges which will be exposed to the weather when the strip is laid.

Figure 7:
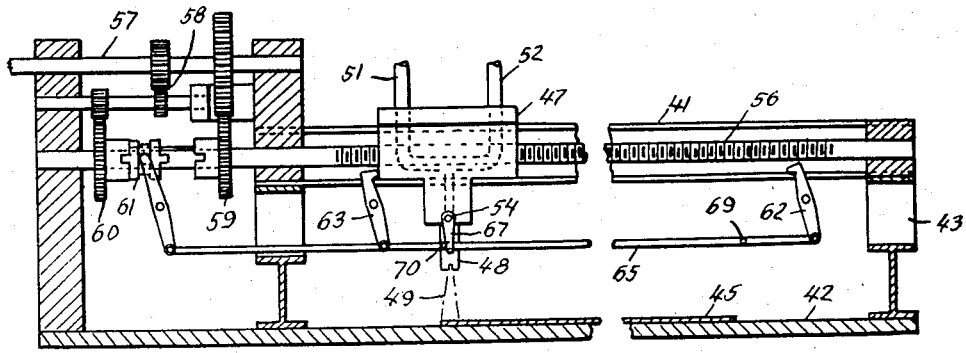
Fig. 7 is a fragmentary enlarged sectional elevation showing the mechanism for reversing the direction of travel of the sprays.

Figs. 6 and 7 show an apparatus for applying parallel bands of coating material at any desired angle to the longitudinal edge of the fabric being coated. Although two spray devices are shown in Fig. 6, only one will be described since both are the same and work in a similar manner. Each device has a horizontal runway 41 supported from table 42 by framework 43. This runway is movable in a horizontal plane and may be set at any desired angle to the longitudinal edge of roofing fabric 45 which passes thereunder. Slidably mounted on the runway is a nozzle carrier or spray carrier 47 having in the lower portion thereof a suitable liquid-delivery or spray nozzle 48 for applying coating material 49 to the fabric. Coating material is pumped to the nozzle through supply line 51, the excess material being recirculated to the source of supply through return line 52. A stop-cock or plug valve 54 is provided in the lower portion of spray carrier 47 so that the coating material being fed to the spray nozzle can alternately be shut off and turned on in a manner more fully pointed out below.

Passing through a hole in the spray carrier provided with an internal screw thread is a screw shaft 56 supported at both ends by bearings mounted in framework 43. Rotation of this screw shaft first in one direction and then in an opposite direction causes spray carrier 47 and the attached spray nozzle 48 to travel back and forth in the runway over the moving sheet of fabric and deposit bands 55 of coating thereon. The pitch of the thread on shaft 56 and its speed of rotation, combined with rate of travel of the felt and angle of shaft 56 to the direction of travel of felt 45, determined the angles of the bands 55 of coating on the felt. Power necessary to rotate the screw shaft is supplied through drive shaft 57 and transmitted through suitable gearing indicated generally by the reference numeral 58 to gears 59 and 60 loosely mounted on one end of the screw shaft. The transmission gearing is so arranged that gears 59 and 60 revolve freely in opposite directions. Keyed on the screw shaft is a longitudinally movable clutch 61 which is adapted to engage with either of the gears and cause rotation of the screw shaft in either direction.

Reversal of the mechanism is made automatic by the mechanism shown in Fig. 7. Pivotally supported reversing arms 62 and 63 are provided near both ends of the runway. Movement of spray carrier 47 against these arms is transmitted through suitable linkage 65 connected thereto and causes a corresponding movement of the clutch 61 on the screw shaft. This movement causes the clutch to disengage from one of the gears and engage with the other thereby resulting in a reversal of the rotation of the screw shaft and a corresponding reversal in the direction of travel of the spray carrier. A spring-and-trigger or equivalent device of any well known form, is used to prevent clutch 61 from remaining in a neutral position after disengagement from either gear 59 or 60. For the sake of simplicity and because it is a well-known mechanical expedient, this device has been omitted from the drawings.

In the drawings, the reversal is pictured as just having occurred so that the spray carrier is beginning its movement from left to right. The spray carrier and attached nozzle will move in this direction and spray coating material onto the fabric until the carrier reaches the other side of the runway and abuts against reversing arm 62. Further movement of the carrier will cause a corresponding movement of this reversing arm which will be transmitted through linkage 65 to clutch 61. This will cause the clutch to disengage from gear 60 and engage with the oppositely rotating gear 59, thereby reversing the directions of rotation of the screw shaft and causing the spray carrier to move from right to left.

At the same time that the spray carrier abuts against the reversing arm, an extension arm 67 on plug valve 54 contacts with a projection 69 on linkage 65. Further movement of the carrier causes the extension arm to be rotated and the plug valve closed, thereby cutting off the supply of coating material to the spray nozzle. The plug valve remains closed and no coating is applied to the sheet of roofing during the travel of the spray carrier from right to left. When the spray carrier reaches the left-hand side of the runway it will abut against reversing arm 63 and at the same time the valve extension arm 67 will abut against projection 70 on the linkage. Further movement of the spray carrier will be transmitted through the linkage causing the screw shaft to reverse its direction of rotation and the spray valve to be again opened.

Although two sprays are shown in the apparatus depicted in Fig. 6, it is obvious that the invention is not limited to this number since either a greater or lesser number may be employed, and other means than a screw shaft may be used for traversing the sprays across the felt.

If only one spray is used, it may be caused to spray during both directions of traverse of the felt. In this case, parallel bands may be applied by changing the angle of support 41 to the direction of travel of the felt for the different directions of traverse of the spray. For example, if the angle between support 41 and the direction of felt travel is 75° on the right of the support, viewing Fig. 6, when spray 48 moves to the right, it may be made 75° to the left of the support when the spray moves to the left.

If desired, suitable heating jackets may be used around the supply and return lines in order to maintain the material passing therethrough at the proper temperature and fluidity.

Figs. 8 to 10 show a modified type of spray apparatus 75 similar to that shown in Fig. 1 for applying sprays 76 of coating material 78 onto a sheet of fabric 80 passing thereunder. This device is similar in construction to the apparatus shown in Fig. 1 with the exception of the outer sleeve 82 having its ends screwed into the T connections 12 and 13. Outer pipe or sleeve 82 of this modified apparatus is provided with a series of spray nozzles 84 welded or otherwise secured along the bottom thereof and communicating with the interior of the sleeve through openings 85. For certain periods during each revolution (or oscillation) of the inner sleeve 10, slots 25 therein coincide with openings 85 in the outer sleeve and allow coating material to be forced through the openings 85 and spray nozzles 84 and ejected in the form of sprays 76 onto the sheet 80. As the inner sleeve 10 continues to rotate the solid wall of the inner sleeve moves over the openings 85 communicating with the spray nozzles 84 and prevents the coating material from being sprayed through the nozzles. Further rotation of the inner sleeve 10 again causes the slots 25 to coincide with the openings 85 in the outer sleeve 82 thereby permitting the coating material to pass through the openings and to be sprayed from the nozzles.

As shown in Fig. 8, the nozzles may be spaced so that the spray 76 issuing from each individual nozzle overlaps the sprays from adjacent nozzles thereby forming a continuous band 87 extending transversely across the entire width of the sheet. By spacing the nozzles further apart, it is possible to arrange them so that the sprays issuing from adjacent nozzles will not overlap, thereby forming bands or stripes each comprising a plurality of coated sections spaced from one another by uncoated portions of the sheet. As a further modification instead of having slots 25 in inner sleeve 10 arranged in a straight line extending longitudinally of the sleeve, they may be staggered around the periphery of the sleeve so that the coating material will not be discharged simultaneously from all of the nozzles.

In connection with the description of the construction and operation of the apparatus of this invention, I have described particularly its use in applying coating material to a sheet in spaced parallel bands. However, the apparatus may be used to apply the coating material in numerous other pleasing designs. For example, by moving the two spray blocks shown in Fig. 6 back and forth over the sheet of roofing at a variable speed or by causing the sheet to travel at a variable rate it is possible to produce the roofing shown in Fig. 11 having coating material applied to a base 90 in undulating bands 91.

Fig. 17 shows an arrangement by which variable movement of the spray carriers may be obtained. The apparatus is similar to that shown in Fig. 6 with the exception that the rotating shaft 56 is disposed above the spray carrier 47 and horizontal runway 41. Instead of being provided with threads of uniform pitch as shown in Figs. 6 and 7, the rotating shaft in the modified apparatus is provided with a spiral groove 93 of variable pitch. A short cylindrical pin or projection 95 is provided on the upper surface of the spray carrier 47, the upper end of the pin fitting in the groove 93 of the rotating shaft. During the rotation of shaft 56, the sides of groove 93 bear against the pin 95 and push the pin and the spray carrier horizontally along the runway, the rate of movement depending upon the pitch of the groove. The greater the pitch of the groove the more rapid will be the movement of the carrier across the sheet.

Fig. 12 is a plan view of a sheet of roofing 98 having coating material 99 applied thereto in a checkered design. This type of roofing may be formed, for example, by arranging three of the spray nozzles shown in Fig. 4 in a single line extending across the width of the sheet and perpendicular to its direction of travel. By periodically first discharging coating material for a short time from the two outer nozzles, and then stopping the flow from these nozzles and discharging from the intermediate nozzle, the coating material would be applied to the sheet in checkered design as shown. Similarly, the slots 25 in the apparatus of Fig. 8 could be arranged along the inner sleeve 10 in staggered rows so that the coating material would periodically be forced through alternate nozzles.

Fig. 13 shows a design which may be produced by first applying spaced parallel bands of coating material 100 to a roofing base, surfacing the spaced bands with granular mineral material of one color, and then applying spaced bands of coating material 101 to the uncoated and unsurfaced portions of the base and surfacing these bands with mineral material of a different color. Two spray nozzles such as those shown in Fig. 1 could be employed for applying the spaced bands of coating material.

A double coating and double surfacing operation may also be carried out in a similar manner by first coating and surfacing the entire length of the sheet and then applying spaced parallel bands of coating material onto the surfaced sheet and surfacing these bands with mineral granules of a contrasting type.

Fig. 14 is a plan view of a sheet of roofing 105 having bands 106 and 107 of coating material applied thereto in a criss-cross design. This type of ornamentation may be obtained by using the apparatus shown in Figs. 1, 6, or 8. When using the apparatus shown in Fig. 1, for example, two spray devices would be employed. One spray device may be set at an angle to the direction of travel of the sheet 105 to form spaced parallel bands 106, and the other device may be set at an angle to the direction of the travel of the sheet to form spaced parallel bands 107 intersecting bands 106 as shown in the drawing.

Fig. 15 shows a sheet of roofing 108 having coating material applied thereto in a zig-zag line 109. Like the roofing shown in Fig. 14, this design may also be produced by employing the apparatus of Figs. 1, 6, or 8. For instance, if two spray devices such as shown in Fig. 1 were used, they could be arranged across the sheet in angular positions with respect to the direction of travel of the sheet similar to those employed when forming the roofing shown in Fig. 14 but spaced a greater distance apart so that the bands of coating material would not cross each other but would meet at the longitudinal edges of the sheet.

Similarly, omitting projections 69 and 70 in the apparatus of Fig. 6 will allow the plug valve to remain open while traveling in both directions. This will cause the coating to be applied to the fabric in the form of zig-zag bands rather than in the form of the parallel bands shown in Fig. 6.

After the sheet has been coated as pointed out above crushed slate or other grit may be partially embedded in the coating. Different colored grits may be applied to different stripes or different colored grits may be applied to contiguous portions of the same stripe to obtain any desired ornamental appearance.

In employing the spray devices of this invention, any pressure may be used in the coating supply line to the spray nozzle which will produce a good spray and give full and uniform coverage of coating material on the desired areas of the roofing. Pressures varying from five to one hundred pounds per square inch have been found suitable depending upon the type of spray nozzle used and the temperature and viscosity of the coating material. For ordinary use pressures from forty to fifty pounds per square inch are preferable. The temperature at which the coating material should be applied depends largely upon the type of material used. When using asphalt coating material having a melting point of 200 to 230° F. an application temperature of 350 to 450° F. is preferable.

Although the apparatus of this invention is described above as being particularly useful in the manufacture of coated sheet roofing, it should be understood that it is not limited thereto but may be used for applying a fluid coating composition to other materials. Furthermore, instead of applying the coating onto the top of a sheet passing under the spray devices, the devices may be arranged to spray upward onto a sheet passing thereover, or to spray horizontally onto a sheet travelling vertically or on its edge.

Since certain changes in carrying out the above process and in the constructions set forth may be made without departing from the scope of the invention, it is intended that all matter contained in the above description or shown in the accompanying drawings shall be interpreted as illustrative and not in a limiting sense.

I claim:

1. An apparatus for applying fluid waterproofing material to a moving sheet of roofing material comprising a liquid-delivery nozzle positioned over the moving sheet, means for intermittently opening and closing said nozzle, means for supplying fluid waterproofing material to the nozzle, and means for removing excess fluid waterproofing material not discharged by said nozzle therefrom.

2. An apparatus for applying spaced parallel bands of coating material to a moving sheet of roofing fabric comprising a spray device positioned over the moving sheet, means for intermittently opening and closing said spray device, an inlet line for supplying coating material to the device, and a return line for circulating the excess coating supplied by said inlet line but not discharged by said spray device back to the source of supply.

3. An apparatus for intermittently applying fluid bitumen in spaced transverse bands onto a moving sheet of roofing comprising a slotted pipe extending across the width of the sheet, means for supplying bitumen to said slotted pipe, and means for periodically closing the slot in the pipe to form said transverse bands on the roofing sheet.

4. A device for spraying hot fluid bitumen onto a moving strip of roofing material comprising in combination a slotted outer sleeve adapted to remain stationary, a slotted inner sleeve adapted to rotate within the outer sleeve, driven means for rotating one of the sleeves relatively to the other whereby the slots are automatically periodically brought into registration, and means for supplying fluid bitumen into the inner sleeve.

5. An apparatus for applying spaced parallel bands of coating material to a moving sheet of roofing comprising a valve extending across the sheet of roofing, means for supplying coating material to the valve, automatically operated means for periodically opening and closing the valve, and a trough for catching drip from the valve to prevent coating material from dripping from said valve after closure thereof onto the sheet.

6. An apparatus for applying spaced parallel bands of coating material to a sheet of roofing fabric comprising a series of spaced liquid-delivery spray nozzles, means for supplying an excess quantity of coating material to the nozzles, a valve for regulating the discharge of coating material from the nozzles, and means for circulating the excess quantity of coating material not discharged from said nozzles back to the source of supply.

7. An apparatus for applying parallel bands of bitumen lengthwise of a traveling sheet of mineral-surfaced roofing comprising a series of spaced spray nozzles, inlet lines for supplying hot fluid bitumen to the nozzles, valves in the inlet lines for regulating the amount of bitumen entering the nozzles, return lines for circulating the excess bitumen not discharged through said nozzles back to the source of supply, and heating jackets surrounding the inlet and outlet lines for maintaining the hot bitumen at the desired temperature.

8. An apparatus for applying spaced parallel bands of hot fluid bitumen to a moving sheet of mineral-surfaced roofing material comprising a runway extending horizontally across the sheet, a spray carrier mounted on said runway, a liquid-delivery nozzle connected to the lower portion of said spray carrier, means passing through said spray carrier for producing a longitudinal movement thereof along the runway, means for reversing the direction of movement of said spray carrier at the end of each longitudinal movement thereof, and means for causing said nozzle to discharge fluid bitumen while said spray carrier is traveling in one direction and for preventing such discharge while said spray carrier is traveling in the other direction.

9. An apparatus for applying spaced parallel bands of hot fluid bitumen to a moving sheet of mineral-surfaced roofing material comprising a series of spaced runways extending horizontally across the sheet, nozzle carriers mounted on said runways, liquid-delivery nozzles connected to the lower portions of said nozzle carriers, means passing through said nozzle carriers for producing a longitudinal movement thereof along the runways, means actuated by said carriers for reversing the direction of movement thereof, and means operated by the movement of said carriers for causing fluid bitumen to be discharged from the liquid-delivery nozzles during movement thereof in one direction and preventing such discharge during movement thereof in the opposite direction.

10. In apparatus for applying a continuously repeating design to a plane surface, a liquid-delivery device, said plane surface being spaced from said liquid-delivery device but in sufficient proximity thereto to receive liquid therefrom, and means including a threaded member to move said plane surface and said liquid-delivery device relatively to each other with varying angular acceleration in continuously repeating cycles.

11. In apparatus for applying a continuously repeating design to a plane surface, a liquid-delivery device, said plane surface being spaced from said liquid-delivery device but in sufficient proximity thereto to receive liquid therefrom, means including a member provided with a thread of varying pitch to move said plane surface and said liquid-delivery device relatively to each other with varying angular acceleration in continuously repeating cycles and automatically operated valve means to interrupt flow of liquid from the delivery device at predetermined intervals.

12. Apparatus for applying spaced parallel bands of coating material to a moving web of roofing comprising a spray device including a discharge nozzle extending across the web of roofing, means for supplying an excess of coating material to the spray device, means for removing the excess coating material not discharged by said spray device therefrom, a valve between said supply means and said discharge nozzle and means for automatically and periodically closing said valve to prevent coating material from being discharged by said spray device.

13. The process of making ornamental roofing which comprises the steps of saturating a felt base with waterproofing material, coating the saturated sheet with a layer of waterproofing material, surfacing the saturated and coated sheet with grit, spraying spaced bands of overlay coating material onto said surfaced sheet, and surfacing said spaced overlay coating bands with grit of a different color from that applied to said first named coating layer.

14. The process of making ornamental roofing which comprises the steps of saturating a felt base with waterproofing material, coating the saturated base with a layer of waterproofing material, surfacing the saturated and coated base with grit, spraying a longitudinal band of overlay coating material onto said surfaced base and surfacing said overlay coating band with grit of a different color from that applied to said first named coating layer.

15. The process of making ornamental roofing which comprises the steps of saturating a sheet of felt base material with waterproofing material, coating the saturated base with a layer of waterproofing material, surfacing the saturated and coated base with grit, spraying spaced transverse bands of overlay coating material onto said surfaced base, and surfacing said transverse bands with surfacing material of a color different than that applied to said first named coating layer.

16. The process of making ornamental roofing which comprises the steps of saturating a sheet of fibrous base roofing material with a waterproofing saturant, coating the saturated sheet with a layer of waterproofing material, surfacing the saturated and coated sheet with grit, spraying overlay fluid coating material onto said coated sheet in an ornamental design and surfacing said overlay coating material with grit of a different color from that applied to said first named coating layer.

CLARENCE R. ECKERT.